Nov. 14, 1950 J. H. VOSS 2,530,104

RELAY AUTOMATIC TELEPHONE SYSTEM

Filed July 1, 1948 6 Sheets-Sheet 1

INVENTOR.
JOHN H. VOSS

BY [signature]

ATTORNEY

Nov. 14, 1950 J. H. VOSS 2,530,104

RELAY AUTOMATIC TELEPHONE SYSTEM

Filed July 1, 1948 6 Sheets-Sheet 2

INVENTOR.
JOHN H. VOSS

BY Chas. Ke. Candy

ATTORNEY

Nov. 14, 1950 J. H. VOSS 2,530,104

RELAY AUTOMATIC TELEPHONE SYSTEM

Filed July 1, 1948 6 Sheets-Sheet 3

*INVENTOR.*
JOHN H. VOSS

*BY* [signature]

ATTORNEY

Nov. 14, 1950 J. H. VOSS 2,530,104

RELAY AUTOMATIC TELEPHONE SYSTEM

Filed July 1, 1948 6 Sheets-Sheet 4

INVENTOR.
JOHN H. VOSS

BY Chas. W. Candy
ATTORNEY

Nov. 14, 1950 J. H. VOSS 2,530,104

RELAY AUTOMATIC TELEPHONE SYSTEM

Filed July 1, 1948 6 Sheets-Sheet 5

TRUNK SELECT RLYS.
TRK. GRP. "B"

INVENTOR.
JOHN H. VOSS

BY Chas. W. Candy

ATTORNEY

Nov. 14, 1950 J. H. VOSS 2,530,104

RELAY AUTOMATIC TELEPHONE SYSTEM

Filed July 1, 1948 6 Sheets-Sheet 6

TRUNK SELECT RLYS.
TRK. GRP. "A"

INVENTOR.
JOHN H. VOSS

BY Chas. Le. Candy

ATTORNEY

Patented Nov. 14, 1950 2,530,104

UNITED STATES PATENT OFFICE 2,530,104

RELAY AUTOMATIC TELEPHONE SYSTEM

John H. Voss, Rochester, N. Y., assignor to Automatic Electric Laboratories, Inc., Chicago, Ill., a corporation of Delaware Application July 1, 1948, Serial No. 36,313

9 Claims. (Cl. 179—18)

Figure 1:
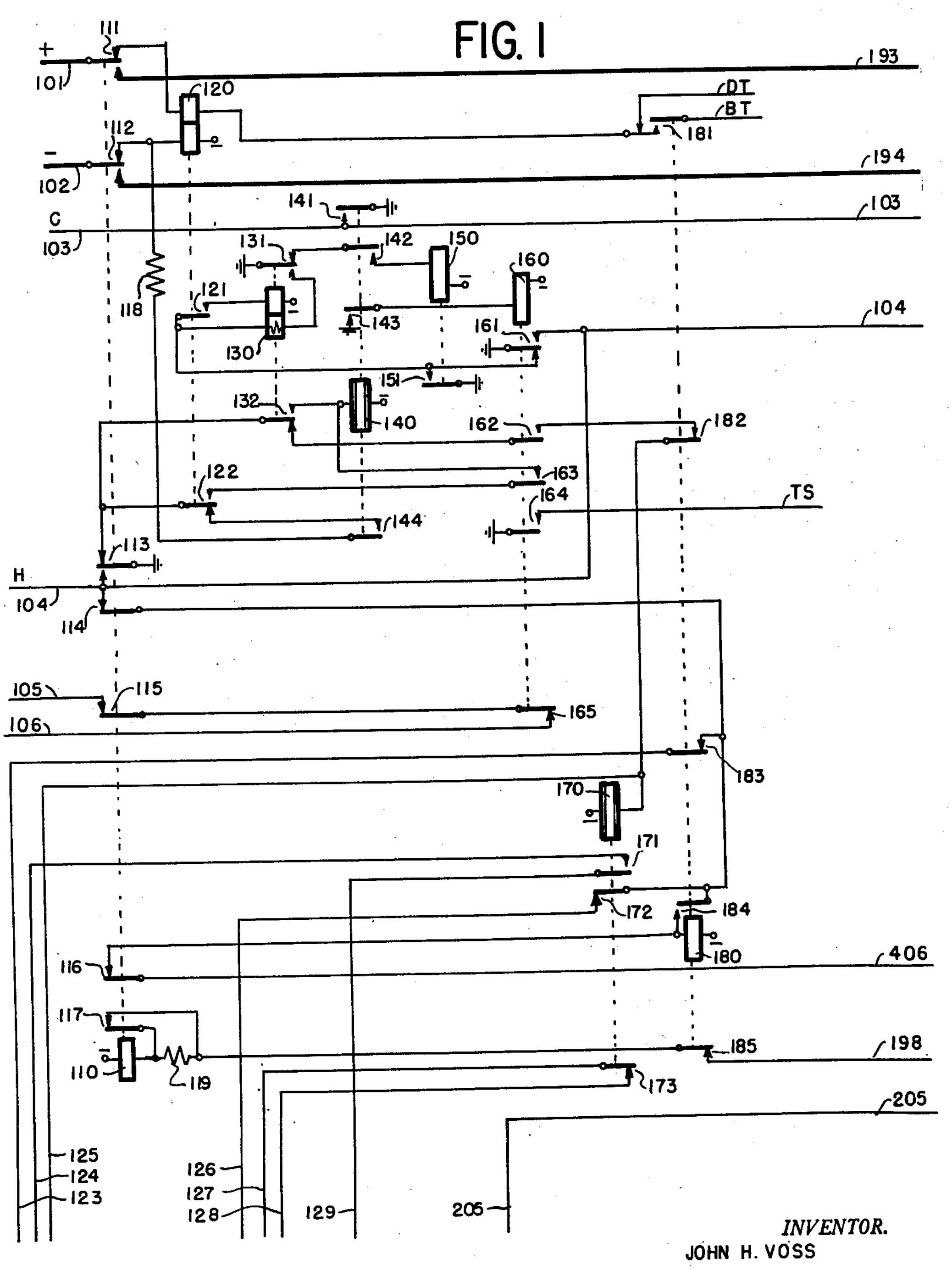

This invention relates in general to automatic telephone systems, but more particularly to all relay systems of the general type illustrated and described in my co-pending joint applications S. N. 632,444 dated December 3, 1945, now Patent No. 2,491,291, and S. N. 720,756 dated January 8, 1947, and deals especially with improvements in trunk selecting equipment for such systems.

In the foregoing systems, the automatic selection of trunks is accomplished by means of groups of trunk selecting relays external to the trunk-calling switches. These relay groups, which serve to preselect idle trunks in the various trunk groups in regular order, may be seized momentarily by any of said switches, in response to the dialling of a proper trunk-group call number to such switch. This automatically causes the operation of the proper units relay or relays in the seizing switch, which thereupon extends the call to the preselected trunk. The select relays are then immediately freed and made available for another call.

In the first previously mentioned application also, a plurality of trunk groups were shown connected to a single tens relay (1040), with means for extending calls to any one of said trunk groups by dialling a single-digit call number, different for each trunk group. This arrangement however, is limited to only ten such trunk groups, since only ten single digit call numbers are available, or to only nine groups, if a first digit "1" is absorbed. This might prove a serious limitation on the capacity of the system, where a large number of small trunk groups must be provided for.

The main object of the present invention is accordingly to provide, for this general type of system, means for giving access to a larger number of small trunk groups, by the use of a preliminary digit.

The main feature of the invention is accordingly the addition to the selector or connector, as the case may be, of a "trunk group expansion" relay, which permits having two trunk groups on any or all of the group relays except one, provided the total number of trunks for the two groups does not exceed ten. To reach one of the trunk groups on a "level" having two trunk groups, a single digit is dialled, whereupon the switch operates in normal fashion to extend the call. To reach the other group of trunks, the same digit preceded by the digit "one" is dialled. The digit "one" is absorbed and the trunk group expansion relay operates. The second digit then causes the selection of the second trunk group instead of the first.

Other objects and features of the invention will be apparent from the description and claims which follow, when considered in conjunction with the accompanying drawings comprising Figures 1 to 6 inclusive, which illustrate one embodiment of the invention applied to an all-relay selector system. It will be understood that only sufficient equipment is shown to enable the invention to be described and understood, and that various modifications of the arrangement shown may be made, without deviating from the range and scope of the invention.

Figure 2:
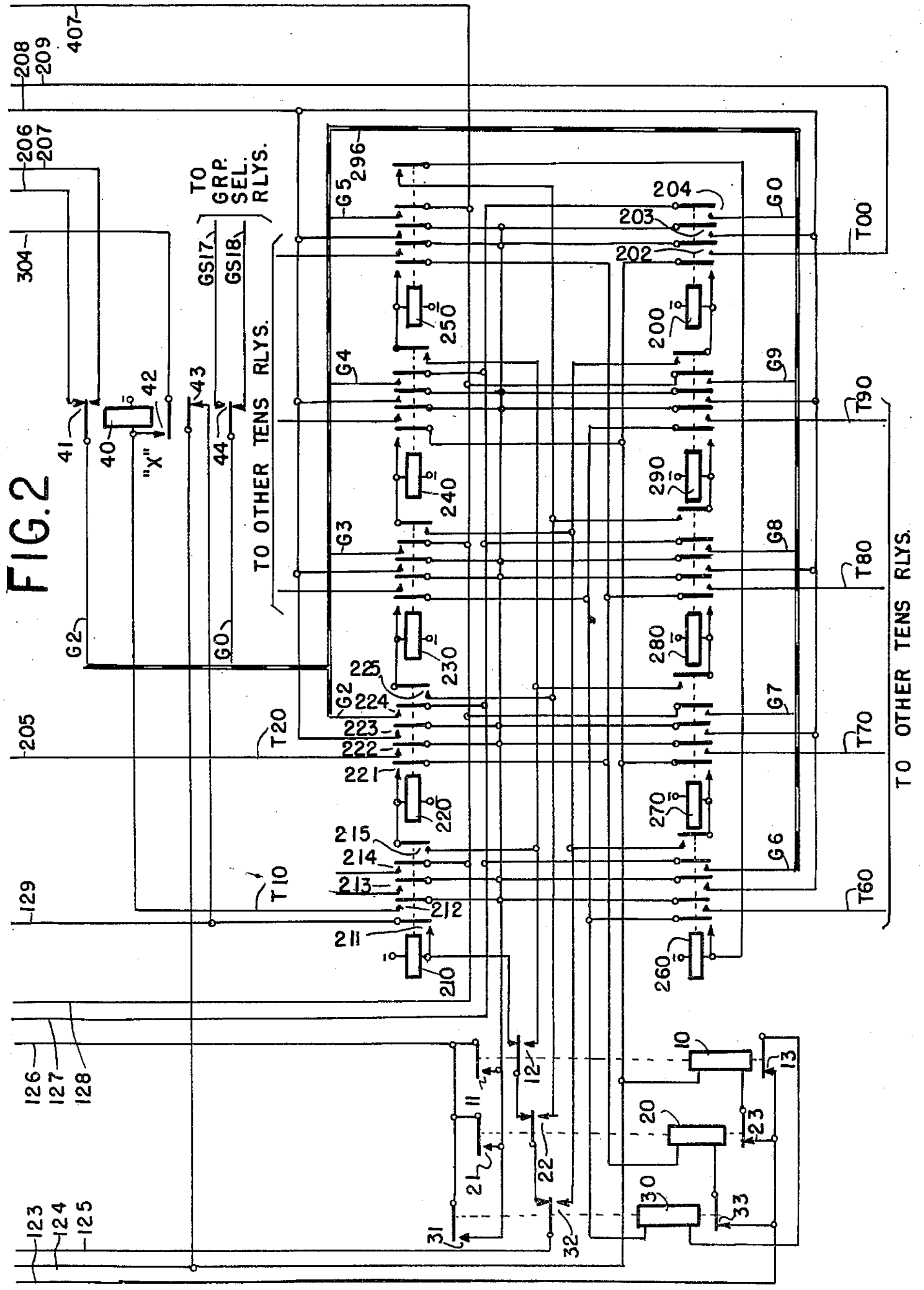
Figure 3:
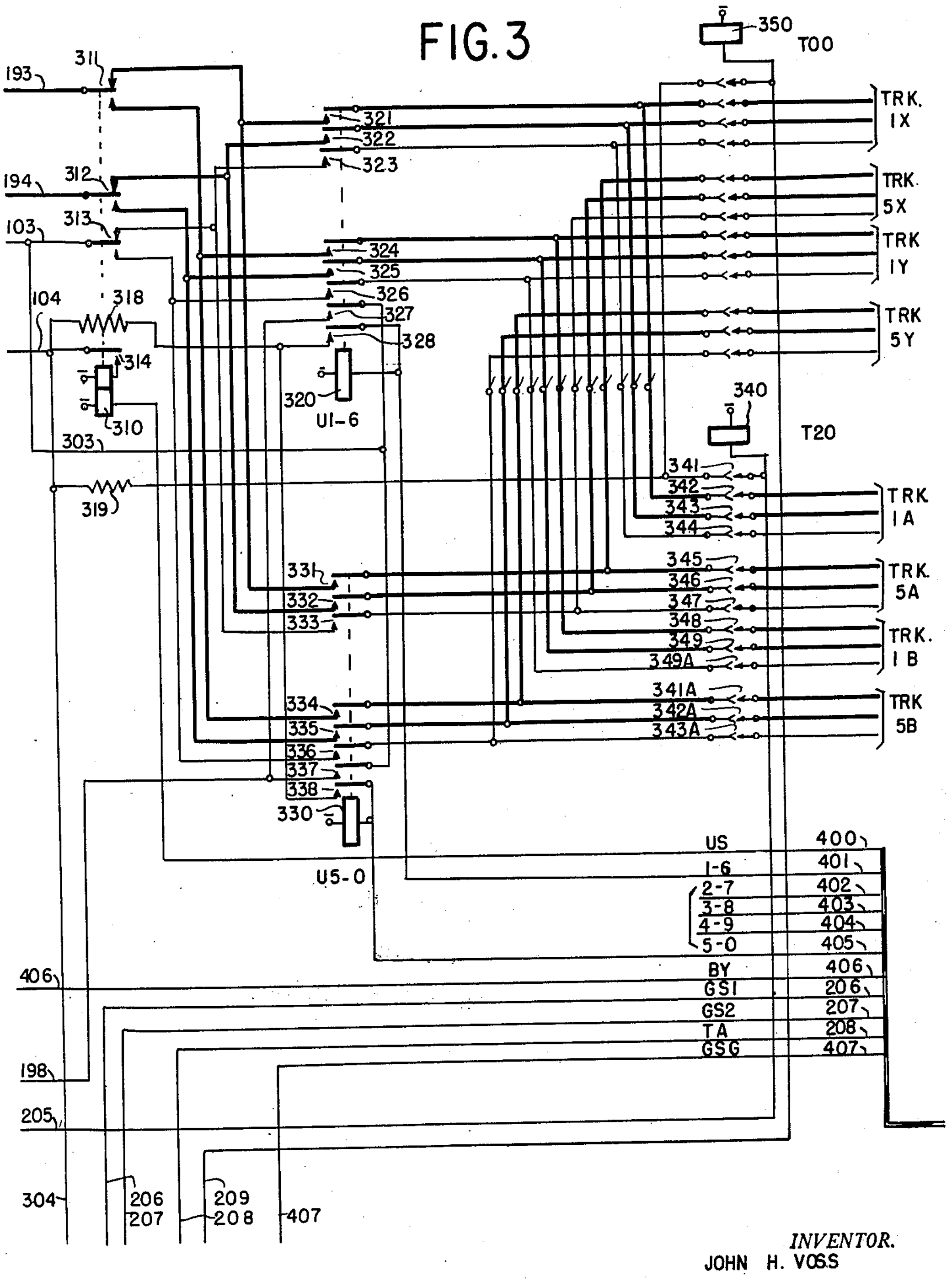
Figure 4:
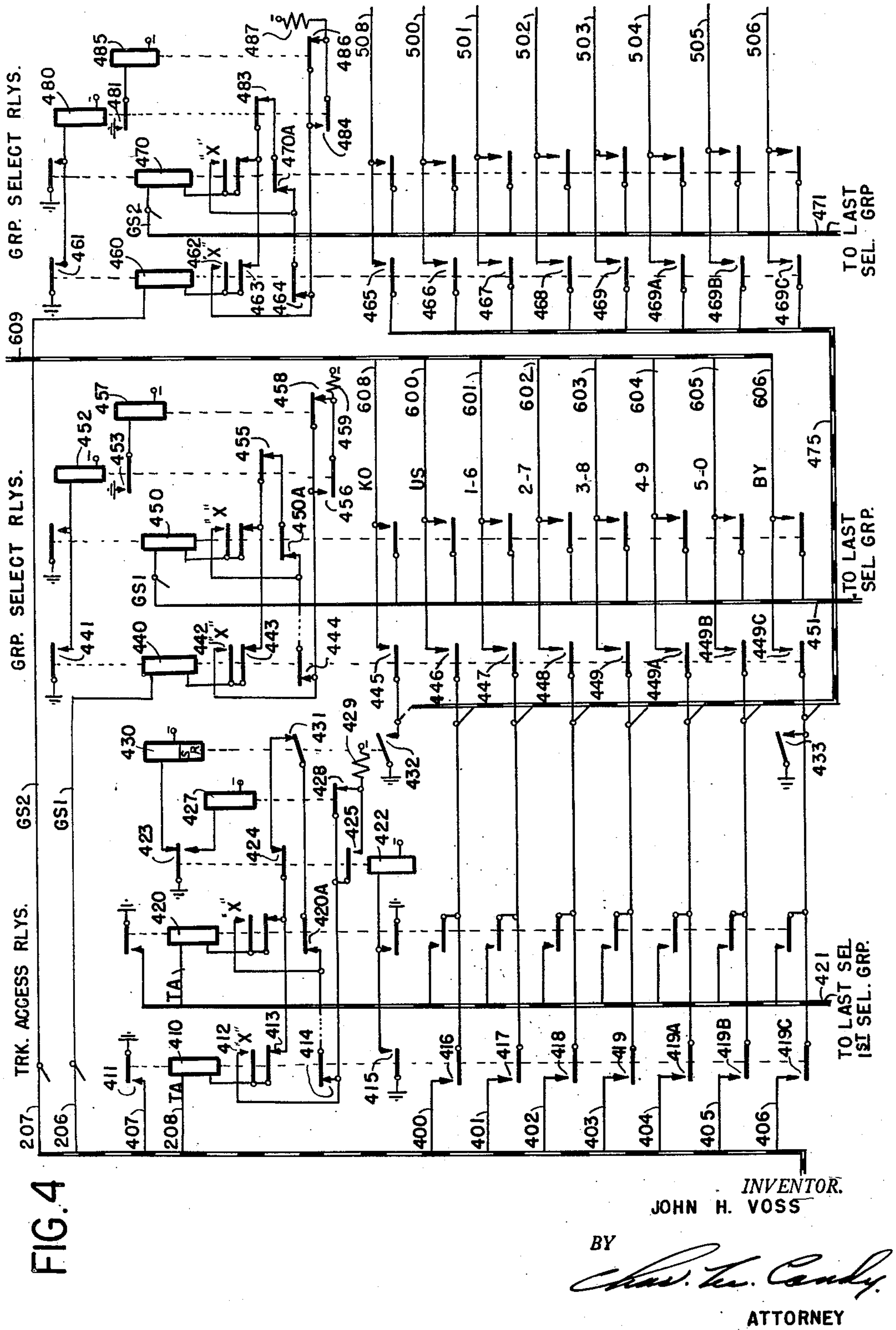
Figure 5:
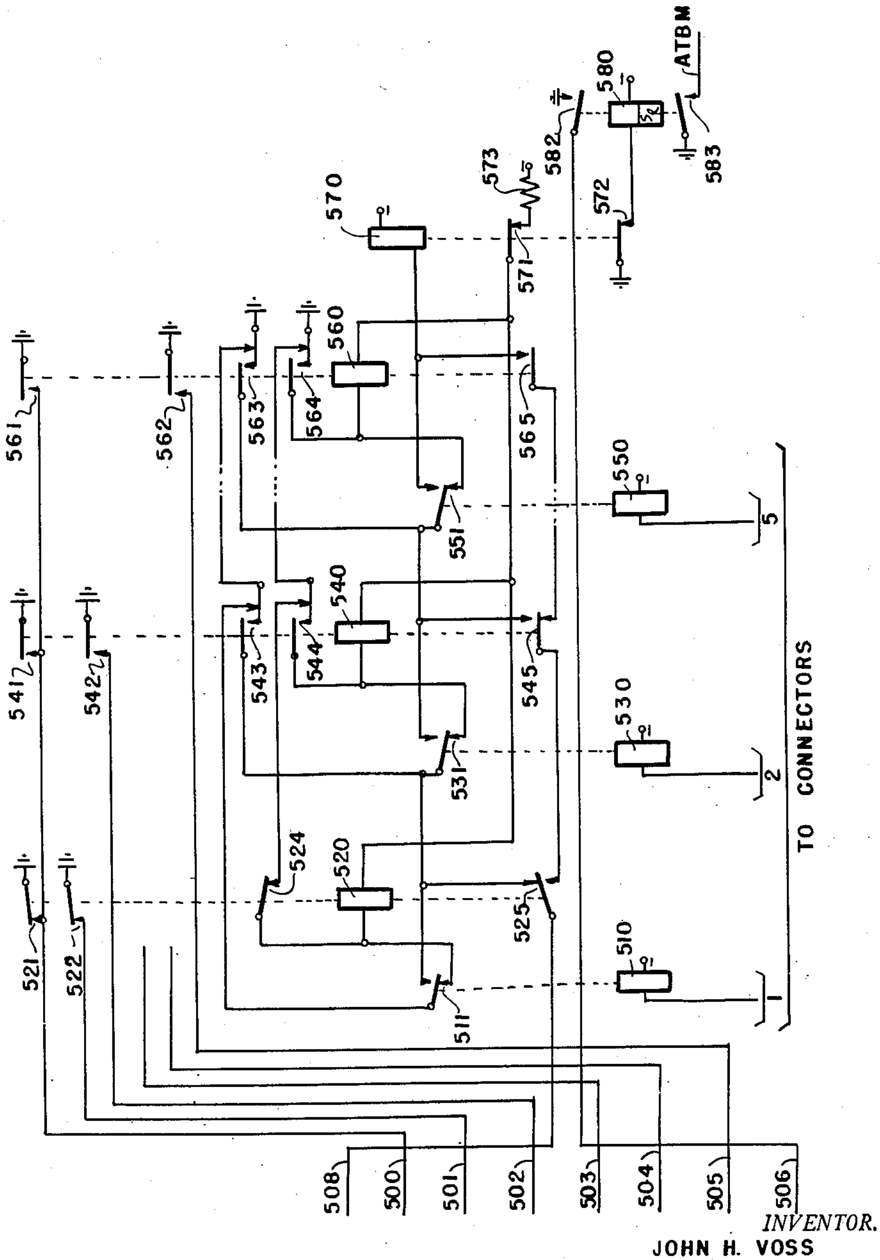
Figure 6:
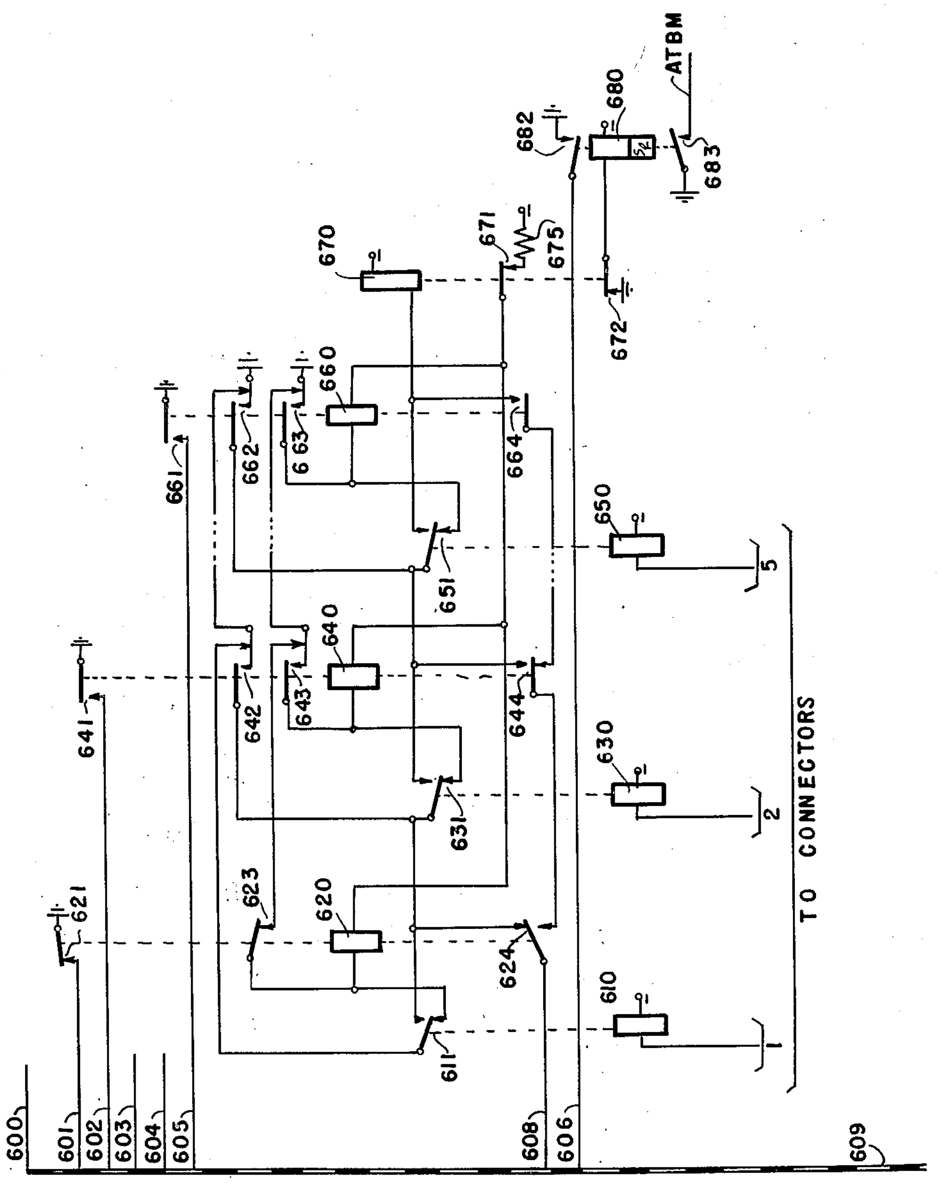

With reference to the drawings, Figures 1, 2, and 3 shown, by means of the usual circuit diagrams, a relay type selector generally similar to that shown in Figures 5 to 8 inclusive, of the aforementioned co-pending application S. N. 720,756, while Figures 4, 5 and 6 show, by means of similar circuit diagrams, a portion of the trunk selecting equipment associated with this selector and other selectors not shown.

With reference to the drawing in more detail, Figure 1 shows a portion of the control relays of the selector, including a "switch-through" relay 110, a "line" relay 120, a "pulsing" relay 130, a "release" relay 140, a "pulse control" relay 150, a "hold" relay 160, a "transfer" relay 170, and a "busy" relay 180. The conductors 101 to 106 on the left side of the sheet, may be assumed to extend to a linefinder not shown, such as illustrated in Figure 2 of the previously mentioned application S. N. 720,756. Conductors 101 and 102 are the line conductors, 103 and 104 are the test and hold conductors respectively, and conductors 105 and 106 are the selector or link-busying conductors.

Figure 2, which goes below Figures 1 and 3, shows the digit register for this selector, comprising ten "counting" relays numbered 210 to 200 inclusive, and three "counting control" relays numbered 10, 20 and 30. The "trunk group expansion" relay 40 is also shown in the upper part of the sheet. This relay requires a set of break-make contacts such as 41 for each group or tens relay provided in the selector. Only two sets, 41 and 44, are shown in the drawing however. The armature springs of these contact sets are connected to the appropriate counting relays of the register, while the front and back contacts are connected to the appropriate group select relays, such as those shown in Figures 4 and 5.

Figure 3, which goes to the right of Figure 1, shows the selector "units switching" relay 310, two "units" relays 320 and 330, and two "tens" or "group" relays 340 and 350. Actually of course, there are five units relays, and nine group relays. The tenth group relay is not required in this selector. Some of the contacts are omitted, also, from the two group relays shown, in order to simplify the drawings. Two trunk groups A and B, each consisting of five trunks, are indicated as being connected to tens relay T20, with group A connected to the first five contact sets on this relay, and group B connected to the last five, while two similar trunk groups X and Y are indicated as being similarly connected to tens relay T00. These trunks may be considered to lead to connectors or repeaters or even to other selectors, but in the present case connectors are assumed throughout.

Figure 4, which goes to the right of Figure 3, shows a group of "trunk access" relays, and two groups of "trunk select" relays. One such group of trunk access relays is required for each group of selectors, and one such group of group select relays for each trunk group. In each trunk access group, one "access" relay, such as 410 or 420 is provided, for each selector in the selector group. These relays, only the first and last of which are shown, operate momentarily when seized by the associated switch, and extend the selector units control and busy conductors to the various groups of group select relays. Relays 422 and 427 are "lockout" relays, which serve to prevent the operation of more than one access relay at a time, in order to prevent two selectors in the same group from seizing this group of trunk access relays simultaneously. Relay 430 is a normally energized "kickoff" relay, which releases on a blocked call, to give a busy signal and advance the trunk selection.

In each group of group select relays, one "group select" relay such as 440, 450, 460 or 470 is provided, for each group of selectors. These relays operate from the digit register of the calling selector, and extend the units control and busy conductors from the trunk access relays involved, to the proper trunk select relays. Thus, in Figure 4, the relays 440 and 460 are operable from any switch in the first selector group and relays 450 and 470 from any switch in the last selector group. The GS leads to these relays, such as conductors 206 and 207, are multipled direct to the selectors, but the lower contacts are wired to the corresponding trunk access relays. The lower contacts of the relays 440 and 460, for example, are wired to the trunk access relays of Figure 4, while those of the relays 450 and 470 are wired to trunk access relays, not shown, associated with the last selector group. The relays 452 and 457, and the relays 480 and 485 of Figure 4, are "lockout" relays, which serve to prevent the operation of more than one group select relay at a time, in the associated relay group, in order to prevent two selectors from being connected simultaneously to the same group of trunk select relays.

Figure 5, which goes to the right of Figure 4, shows the trunk select relays for the "B" group of trunks, which are indicated as being connected to the contact sets 6 to 0 of group relay 340 in the selector. In this circuit, a "trunk busy" relay such as 510, 530 or 550 is provided for each trunk in the group. These relays are normally operated, through break contacts in the associated connector or repeater, and release individually as the said connectors or repeaters are taken into use, or otherwise made busy. A "preselect" relay, such as 520, 540 and 560 is also provided for each trunk in the group. These relays operate one at a time in rotation as the trunks are successively taken into use, to preselect the next idle trunk. As each preselect relay operates, it releases the preceding relay and prepares a circuit to the proper selector units relay or relays. Relay 570 is a "reset" relay, and relay 580 is an "all-trunks-busy" relay, which is normally energized. Preselect and busy relays are shown for the 1st, 2nd and 5th trunks only, those not shown being similar. These relays are reached through the group select relays 460—470.

Figure 6, which goes above Figures 4 and 5, shows the trunk select relays for the "A" group of trunks, which are indicated as being connected to the contacts sets 1 to 5 of group relay 340 in the selector. These trunk select relays, which are identical with those of Figure 5 and operate similarly, are accessible through the group select relays 440—450. It will be understood of course, that while in the present instance, the trunks have been shown in regular groups of five, regularly distributed on the terminals of the selector group relays, they could just as well have been arranged in various other combinations, such as 4 and 6, 3 and 7, and so on. Full groups of ten trunks having a common single-digit call number, may also be provided on some of the group relays in the selector, if desired, in which case there would be no corresponding two-digit number employed.

The description of the drawings and apparatus, and the general mode of operation having been completed, a detailed description of the circuit operation will now be given to provide a complete understanding of the invention.

*Single-digit trunk calls*

For the purposes of this invention it is immaterial whether the trunks involved extend to connectors, or to trunk repeaters providing outlets to other exchanges, or even to other selectors. The operation is the same.

Thus, to gain access to trunk group A for example, a calling party has only to remove the receiver or handset from their telephone and dial the digit "2." Upon removal of the receiver, a linefinder, not shown, operates quickly to find the calling line, and extends it to an associated selector, such as the selector of Figures 1, 2 and 3 herewith, for example. The selector line relay 120 thereupon operates over the following circuit: ground through the secondary winding of a dial tone transformer, not shown, to the DT conductor, through back contacts of the make before break springs 181, upper winding of relay 120, back contacts 111, talking conductor 101, through the finder to the calling telephone and back to the talking conductor 102, back contacts 112, and the lower winding of relay 120 to battery. Line relay 120 upon operating, at contacts 121 operates pulsing relay 130 from ground at back contacts 161. Relay 130 upon operating, at make contacts 131 closes a locking circuit for itself through its noninductive lower winding, and at make contacts 132 operates release relay 140. Release relay 140 in turn, at contacts 141 grounds test conductor 103 back through the finder to the calling line, to clear the line of attachments in known manner, in preparation for dialling. Release relay 140 also, at contacts 143 operates hold relay 160, in obvious manner.

Hold relay 160 upon operating, at make contacts 161 grounds the hold conductor 104 to hold the finder, at contacts 162 prepares the pulsing circuit to the digit register, at contacts 163 closes another circuit to release relay 140 from ground through contacts 113 and 122, at contacts 164 grounds the tone generator start conductor TS, and at break contacts 165 marks this link as busy at the link allotter, not shown, and causes the latter to preselect the next idle link, in known manner. As soon as the tone generator starts, dial tone is impressed on the DT conductor and is superimposed on the previously traced circuit for line relay 120, and so to the calling line, where it is made audible in the receiver of the calling telephone. If the tone generator is already in operation from another source, dial tone will be heard immediately upon the extension of the calling line to the selector.

The calling party, upon hearing the dial tone, dials the digit "2" as indicated, whereupon the selector line relay restores and re-operates twice. At each release of line relay 120, make contacts 121 release pulsing relay 130, make contacts 122 open one of the circuit to release relay 140, and break contacts 122 close a "priming" circuit to the lower winding of relay 120, from ground at back contacts 113, by way of contacts 122 and 144, and the resistor 118. Only enough current flows over this circuit however, to prepare the line circuit to re-operate quickly, when its main circuit is again closed at the calling party's dial. At each release of pulsing relay 130, back contacts 131 pass ground by way of contacts 142 to the pulse control relay 150 which operates. Relay 130 also, at back contacts 132 momentarily closes the register pulsing circuit, and at make contacts 132 momentarily opens the circuit of release relay 140. The latter relay however, is made slow to release, as by the use of a copper sleeve over the core, and remains operated. At each re-operation of line relay 120, contacts 121 again operate pulsing relay 130, but now the circuit is from ground at contacts 151 on the pulse control relay. Line relay 120 at the same time, at make contacts 122 re-energizes release relay 140, and at back contacts 122 opens the line relay priming circuit, to permit the quick release of this relay on the next dial impulse. At each re-operation of pulsing relay 130, make contacts 131 reclose the locking circuit of this relay, while break contacts 131 release pulse control relay 150. Make contacts 132 at the same time close a second circuit to release relay 140, while back contacts 132 open the register pulsing circuit.

At each closure of the register pulsing circuit at back contacts 132, ground from back contacts 113 passes through contacts 132, 162 and 182, conductor 125, and contacts on the counting control relays for the operation of the register counting relays. The slow to release transfer relay 170, being connected in multiple with this circuit, operates on the first pulse, and releases shortly after the last pulse. Counting relay 210 also operates on the first pulse, over back contacts 32, 22 and 12, and at contacts 211 and 215 respectively, prepares circuits for counting control relay 10, and counting relay 220. Relay 220 can not yet operate because of open make contacts 12, and relay 10 can not yet operate because it is shunted by ground on both sides of its winding. On the break of the pulse however, this shunt is removed, and relay 10 operates in series with relay 210 and holds the latter operated over the following circuit: ground on the hold conductor 104 from contacts 161, through contacts 114 and 183, conductor 123, contacts 23, relay 10, conductor 124, contacts 171 and 43 in multiple, conductor 129, contacts 211, and relay 210 to battery. Relay 10 upon operating, at contacts 12 transfers the now open pulsing circuit from relay 210 to relay 220. Counting relay 220 accordingly operates on the second pulse, and at contacts 221 and 225 respectively, prepares circuits for counting control relay 20 and counting relay 230. Relay 20 is now also shunted to ground on both sides of its winding, but on the break of the pulse this shunt is removed, and relay 20 operates in series with relay 220 over a direct circuit from the previously traced hold relay ground on conductor 123, through contacts 33, relay 20, contacts 221, and relay 220 to battery. Relay 20 upon operating over this circuit, at contacts 22 transfers the pulsing circuit to counting relay 230, and at contacts 23 opens the locking circuit of register relays 10 and 210 which restore.

Transfer relay 170 also restores after a slight delay, following the last pulse of the digit dialled, and closes break contacts 172 and 173. Contacts 173 are without effect at the moment, but contacts 172 cause the simultaneous operation of tens relay 340 and access relay 410. The circuit for relay 340 may be traced from hold relay ground on conductor 104, through contacts 114 and 172, conductor 126, contacts 21 and 222, conductor 205 and relay 340 to battery. The circuit for relay 410 is from the same ground, through contacts 223, conductor 208, relay 410, contacts 413, 424 and 431, contacts 420A and 414 and similar contacts in series on the intervening access relays not shown, contacts 428 and resistor 429, to battery.

The selector tens relay 340 upon operating, at its lower contacts prepares connections to the trunks of the A and B trunk groups, and at contacts 341 locks through resistor 319 to hold-relay ground on hold conductor 104.

The trunk access relay 410 upon operating, at its contacts 416 to 419C extends the selector units and busy conductors to the various groups of group select relays. Relay 410 also, at preliminary make contacts 412 locks to battery at resistor 429 independently of contacts 413, and at contacts 414 opens the operate circuit to the other access relays to prevent their operation from another selector at this time. If two of these relays are energized at the same time by simultaneous calls from different selectors of the same group, the one located first in the chain will disconnect the other and prevent its complete operation. Relay 410 further, at contacts 415 operates lockout relay 422, whereupon contacts 425 shunt break contacts 428, contacts 424 open another point in the access relay operate circuit, and contacts 423 operate lockout relay 427, and momentarily de-energize kickoff relay 430. The latter relay is made slightly slow to release however, and ordinarily remains operated during the normally brief interval that the access and lockout relays are operated. Relay 410 finally, at contacts 411 closes a circuit to group select relay 440 as follows: ground at contacts 411, conductors 407 and 128, contacts 173, conductor 127, contacts 224, conductor G2, back contacts 41, conductor 206, relay 440, contacts 443 and 455, contacts 450A and 444 and corresponding contacts on intervening group select relays not shown, contacts 458 and resistor 459, to battery.

Group select relay 440 operates over this circuit, and at contacts 445 to 449C extends the units, busy, and kickoff conductors from the access relays to the trunk select relays of Figure 6, by way of the cable 609. Relay 440 also, at preliminary make contacts 442 locks to battery at resistor 459 independently of contacts 443, and at contacts 444 opens the operate circuit to the other group select relays such as 450, to prevent their operation from another selector group at this time. Relay 440 further, at contact 441 operates lockout relay 452. Lockout relay 452, at contacts 456 shunts break contacts 458, at contacts 455 opens another point in the operate circuit of the group select relays, and at contacts 453 operates lockout relay 457. Lockout relay 457 thereupon opens break contacts 458. These contacts are without effect at the moment however due to being shunted at the closed contacts 456.

Immediately upon the extension of the units control conductors to the trunk selecting relays, assuming all trunks idle and preselect relay 620 operated as shown, the 1–6 units relay 320 in the selector is operated over the following circuit: ground at contacts 621, conductor 601, contacts 447 and 417, conductor 401 and relay 320 to battery. The 1–6 units relay 320 thereupon, at its upper make contacts prepares circuits to corresponding contacts on the various tens or group relays, and at contacts 328 locks by way of resistor 318 to hold-relay ground on conductor 104. Relay 320 also, at contacts 327 operates switch-through relay 110 over the following circuit: ground from make contacts 141, conductors 103 and 303, contacts 327, 185, and 117, and relay 110 to battery.

Switch-through relay 110 upon operating over this circuit, at contacts 117 removes the shunt from resistor 119, in order to reduce the current flow through relay 110, which is provided with a low resistance winding to make it fast operating. Relay 110 also at contacts 116 disconnects busy relay 180, at contacts 115 opens another point in the selector busying circuit, and at contacts 114 removes register locking ground from conductor 123, thereby releasing register relays 20 and 220. Switch-through relay 110 finally, at break-make contacts 113 removes ground from release relay 140 and connects its own ground to the hold conductor 104, and at break-make contacts 111 and 112 disconnects line relay 120 and extends the calling line through to the trunk 1A, by way of the talking conductors 193 and 194, back contacts 311 and 312 and contacts 321 and 322, and 342 and 343. This causes the seizure of the A1 connector which returns ground to the test conductor 103, by way of contacts 344, 323 and 313. The selector line relay 120 restores, as soon as its circuit is opened, and releases pulsing relay 130. Release relay 140 then restores, after a short delay, and releases hold relay 160.

Meanwhile, the release of the register has caused the simultaneous release of the operated access and group select relays 410 and 440. Relay 410 in turn causes the release of lockout relays 422 and 427, and the re-energization of kickoff relay 430, in time to prevent the release of the latter relay, while relay 440 causes the release of lockout relays 452 and 457. During the brief interval between the successive release of the lockout relays 422 and 427 battery is momentarily disconnected from all of the access relays, to assure the full release of relay 410 before any other relay can operate in this group. Lockout relays 452 and 457 act similarly.

The connector 1A upon seizure, also opens the normally closed circuit of the trunk busy relay 610 in the trunk select relays. Relay 610 accordingly restores, and causes preselect relay 640 to operate, from ground through back contacts 662 and 642 and similar contacts on preselect relays No. 3 and No. 4 not shown, back contacts 611, make contacts 631, relay 640, contacts 671 and resistor 675 to battery. The No. 2 preselect relay 640 upon operating, at contacts 644 advances the kickoff circuit, and at contacts 643 locks to ground at back contacts 663 and opens the locking circuit of preselect relay 620 which restores. Relay 640 also, at contacts 641 grounds the units control conductor 602, now open at the trunk-access and group-select relays, and at contacts 642 disconnects its original operate circuit, and substitutes a more direct circuit.

Upon the next call to this trunk group, preselect relay 640 will cause the operation of the selector 2–7 units relay, not shown, and thereby extend this call to the A2 connector. Upon the seizure of this connector, trunk busy relay 630 will restore, and cause the operation of the third preselect relay, not shown, which, in turn, releases preselect relay 640. Further calls will be directed in similar manner to the 3rd, 4th and 5th connectors in turn, and on the seizure of the last connector, trunk busy relay 650 will restore, and operate reset relay 670, from ground through make contacts 662 and back contacts 651. Reset relay 670 thereupon, at contacts 671 releases preselect relay 660, and the latter relay in turn, releases the reset relay, and assuming the first trunk to be free again, re-operates preselect relay 620. The cycle then repeats, skipping still busy trunks as necessary. If the other trunks are all still busy however, all of the trunk busy relays will be normal, and no preselect relay will re-operate. Reset relay 670 will therefore remain operated, over back contacts such as 662, 642, 611, 631 and 651, and will cause the circuit of relay 680 to be held open, at contacts 672. The slow to release all-trunks-busy relay 680 will accordingly restore, after the usual slight delay, at contacts 682 will prepare a busy circuit, and at contacts 683 will operate an all-trunks-busy meter, not shown.

Should any further calls be attempted to this trunk group, while all trunks are thus busy, no units relays will be operated in the selector, since all of the preselect relays in Figure 6 are restored, but ground from break contacts 682 on conductor 606 will cause the operation of busy relay 180 in the selector, by way of contacts 449C and 419C, conductor 406 and contacts 116. Busy relay 180 upon operating, at contacts 184 locks to the hold conductor, and at contacts 183 releases the digit register, which in turn releases the operated trunk access and group select relays. Relay 180 also, at contacts 182 disconnects the pulsing circuit, and at contacts 181 connects busy tone to the calling line. Grounded battery superimposed on this tone, serves to maintain line relay 120 operated.

In the case of a blocked call, where with idle trunks available in the called trunk group, the call is not switched through promptly, or where the trunk access relays fail to restore for any reason within the time limit of kickoff relay 430, this relay will release, opening contacts 431, and closing contacts 432 and 433. Contacts 433 thereupon operate the busy relay in the selector by way of conductor 406, and the busy relay in turn gives the busy signal to the calling line and releases the trunk access and group select relays. Contacts 432 at the same time pass ground forward over the kickoff conductor 608, thereby operating the next preselect relay to prepare selection of a different trunk. The calling party will then hang up and try again, and the call will be directed to the next idle trunk.

Access to the "X" group of trunks is obtained in similar manner, by dialling the digit "0," instead of the digit "2." The selector digit register in response to this digit, counts off ten steps, leaving register relays 200 and 10 locked operated, and the other register relays normal. Upon the release of transfer relay 170 following the last pulse, ground from the hold conductor 104 passes through contacts 114, 171 and 11, to contacts 202 and 203 on the operated counting relay 200. This ground extends through contacts 202 to conductor 209 and thence to the selector group relay 350, which operates. It also extends through contacts 203 to conductor 208 and thence to trunk access relay 410, which operates. Access relay 410 in turn, passes back ground from contacts 411 over conductor 407, which ground passes through conductor 128, contacts 173, conductor 127, contacts 204, conductor G0 through the cable 296, back contacts 44 and conductor GS18 to a group select relay not shown, assigned to serve the "X" trunk group. This group select relay upon operating, connects the selector to an associated group of trunk select relays, not shown, which operate one of the units relays in the selector, in the manner previously described. The operated units relay then operates the selector switch-through relay 110 as before, and the call is immediately extended to an idle trunk in the "X" trunk group, while the digit register, and the trunk access and group select relays restore, and the trunk select relays advance to the next idle trunk.

*Two-digit trunk calls*

To extend a call by way of the "B" group of trunks, or connectors, connected to the last five contacts sets of tens relay 340, the digits "12" must be dialled to the selector. Upon the seizure of the selector in response to the calling party's removing the receiver or handset from his telephone, the line, pulsing, release, and hold relays 120, 130, 140 and 160 operate as before, and return dial tone.

Upon the dialling of the first digit "1," the line and pulsing relays release and re-operate once. On the release of pulsing relay 130, transfer relay 170 and counting relay 210 operate in parallel, over the pulsing circuit through contacts 132, 162 and 182, and conductor 125. Upon the re-operation of relay 130, the pulsing circuit is broken and counting control relay 10 operates in series with relay 210 and locks the latter operated. This locking circuit is as previously described, from ground on the hold conductor 104 through contacts 114, 183 and 23, relay 10, contacts 171 and 43 in multiple, conductor 129, contacts 211 and relay 210 to battery.

Transfer relay 170 then releases, after a short delay, and at contacts 171 opens one of the multiple locking circuits for relays 10 and 210. Relay 170 also, at contacts 172 operates the trunk-group-expansion relay 40 over the following circuit: ground from hold conductor 104, through contacts 114, 172, 11 and 212, and relay 40 to battery. Relay 40 upon operating, locks at preliminary make contacts 42 to hold-relay ground on conductor 104, by way of conductor 304. Relay 40 also operates its various break-make contacts, such as 41 and 44, and at break contacts 43 opens the second locking circuit for register relays 10 and 210, which restore.

Upon the dialling of the second digit "2," transfer relay 170 operates on the first pulse and releases after the second pulse as before, after a short delay. Register relays 210 and 10 also operate on the first pulse, and relays 220 and 20 on the second pulse. Now, when transfer relay 170 restores, following the operation of relays 220 and 20, it causes the simultaneous operation of tens relays 340 and access relay 410, just as for the previously described call to the A trunk group, from ground on hold conductor 104, through contacts 114, 172, 21, 222, and 223, and conductors 205 and 208. Tens relay 340 upon operating, prepares connections as before to both the "A" and "B" trunk groups, and at contacts 341 again locks through resistor 319 to ground on conductor 104.

Trunk access relay 410 upon operating, locks itself operated, extends the units control conductors to the group select relays as before, again operates lockout relays 42 and 427 momentarily, and at contacts 411 operates group select relay 460 over the following circuit: ground at contacts 411, through conductors 407 and 128, contacts 173 and conductor 127, contacts 224 and condutor G2, make contacts 41 and conductor 207 to relay 460, contacts 463 and 483, contacts 470A and 464 and similar contacts on the intervening group select relays not shown, contacts 486 and resistor 487 to battery.

Group select relay 460 upon operating over this circuit, at contacts 465 and 469C extends the units-control, busy, and kick-off conductors from the trunk access relays and the cable 475 to the trunk select relays of Figure 5. Relay 460 also, at preliminary make contacts 462 locks itself operated, and at contacts 461 momentarily operates lockout relays 480 and 485, the operation being similar to that already described for group select relay 440.

Immediately upon the extension of the units control conductors to the trunk selecting relays, assuming all trunks of the associated trunk group to be idle, and preselect relay 520 operated as shown, units relay 320 and units-switching relay 310 in the selector operate from relay 520 simultaneously. The circuit for units relay 320 is from ground at contacts 522, through conductor 501, contacts 467 and 417, conductor 401, and relay 320 to battery. The circuit for relay 310 is from ground at contacts 521, conductor 500, contacts 466 and 416, conductor 400, and the lower winding of relay 310 to battery.

The units switching relay 310 upon operating, reverses its break-make contacts, and at make contacts 314 locks to ground on conductor 104. Units relay 320 upon operating, prepares the extension of the call at contacts 324, 325 and 326, at contacts 328 locks through resistor 318 to ground on conductor 104, and at contacts 327 operates switch-through relay 110, by way of conductor 198 and contacts 185.

Switch-through relay 110 thereupon at contacts 114 opens the register locking circuit and releases relays 20 and 220 as before, at contacts 113 opens the circuit of release relay 140, and at contacts 111 and 112 disconnects line relay 120, and extends the calling line through to the trunk 1B, by way of conductors 193 and 194, make contacts 311 and 312, make contacts 324 and 325 and make contacts 348 and 349. This causes seizure of the 1B connector, which returns ground by way of make contacts 349A, 326, and 313, to test conductor 103. The selector line relay 120 restores, as soon as its circuit is opened at back contacts 111 and 112, and releases pulsing relay 130. Release relay 140 also restores, after a short delay, and releases hold relay 160. At the same time, the release of the register causes the release of the operated access and group select relays 410 and 460.

The seizure of the connector 1B also opens the normally closed circuit of trunk busy relay 510, whereupon this relay restores, and at back contacts 511 causes the operation of the second preselect relay 540, which releases preselect relay 520, in the same manner as previously described for Figure 6. Further calls to this trunk group are thus directed successively to the trunks 2B, 3B and 4B, by the operation from Figure 5, of the second, third and fourth units relays, not shown, in the selector, together with the units switching relay 310. On the 5th call, relays 310 and 330 are operated, from contacts 561 and 562 on preselect relay 560, and cause the call to be extended to the trunk 5B, by way of make contacts 311 and 312, make contacts 334 and 335, and make contacts 341A and 342A. Upon the release of trunk busy relay 550, reset relay 570 will operate momentarily, and reset the preselect chain, in the manner previously explained for Figure 6.

Calls to trunk group Y are made in similar manner, responsive to the dialling of the digits "10."

What is claimed is:

1. In an automatic telephone system, a relay type switch, a group relay in said switch, first and second groups of contacts on said relay, two trunk groups each comprising a plurality of trunks accessible to said switch, means in said switch responsive to a calling party dialling a single digit thereto for operating said relay and causing said switch to extend the call through the first group of contacts of said relay to a preselected idle trunk in one of said trunk groups, and means in said switch responsive to a calling party dialling the same digit thereto preceded by a different digit for operating said relay and causing said switch to extend the call through the second group of contacts of said relay to a preselected idle trunk in the other of said trunk groups.

2. In an automatic telephone system, a first and a second trunk group each comprising a plurality of trunks, a relay type switch having access to said trunks, units relays and a group relay in said switch, contacts on said units relays, first and second groups of contacts on said group relay trunk selecting equipment external to said switch for preselecting idle trunks in said trunk groups, means in said switch responsive to a calling party dialling a particular digit thereto for operating said group relay and causing said trunk selecting equipment to operate said units relays to extend the call through the contacts of said operated units relays and the first group of contacts of said operated group relay to a preselected idle trunk in said first trunk group, and means in said switch responsive to a calling party dialling the same digit thereto preceded by a different digit for operating said group relay and causing said trunk selecting equipment to operate said units relays to extend the call through the contacts of said operated units relays and the second group of contacts of said operated group relay to a preselected idle trunk in said second trunk group.

3. In an automatic telephone system, a relay type switch, units relays and a group relay in said switch, contacts on said relays, two trunk groups each comprising a plurality of trunks connected to the contacts of said group relay, a trunk group expansion relay in said switch, trunk selecting equipment external to said switch, means in said switch responsive to a calling party dialling a particular digit thereto for operating said expansion relay, means in said switch responsive to a calling party dialling a different particular digit thereto for operating said group relay and seizing said selecting equipment, and means responsive to such seizure for operating said units relays in different combinations from said selecting equipment to extend the call through the contacts of said units and group relays to one of said trunk groups in case said expansion relay is normal, and to the other of said trunk groups in case said expansion relay is operated.

4. In a relay automatic telephone system, a switch for extending calls, units relays and a group relay in said switch, contacts on said relays, a first and a second group of trunks accessible through the contacts of said group relay, a trunk access unit, a first and a second truck select unit corresponding to said trunk groups, a group expansion relay means responsive to a calling party dialling a particular digit to said switch for operating said expansion relay, means responsive to a calling party dialling a different particular digit to said switch for operating said group relay and seizing said access unit, means responsive to such seizure for connecting said switch to said first select unit in case said expansion relay is normal, and to said second select unit in case said expansion relay is operated, and means responsive to such connection for operating certain of said units relays from such connected select unit to extend the call through the contacts of said units and group relays to a preselected idle trunk in the corresponding one of said trunk groups.

5. In an automatic telephone system, a relay switch having units relays and more than five group relays therein, first and second trunk groups connected to each of said group relays, said trunk groups different for each group relay, a trunk select unit for each trunk group, means responsive to a calling party dialling a single digit to said switch for operating any one of said group relays depending on the digit dialled and for seizing one of the associated select units, means responsive to such seizure for controlling said units relays from such seized select unit to extend the call to an idle trunk in the first trunk group connected to the operated group relay, means responsive to a calling party dialling the same digit to said switch following a different particular digit for operating the same group relay and seizing the other associated select unit, and means responsive to such seizure for controlling said units relays from such last seized select unit to extend the call to an idle trunk in the second trunk group connected to the operated group relay.

6. In an automatic telephone system, a relay switch for extending calls, nine group relays in said switch, two trunk groups accessible to each of said relays, said trunk groups being different for each relay, means for operating each of said relays in response to both a single and a two-digit number dialled to said switch by a calling party, said single digit numbers being used as the second digit of the corresponding two digit numbers and the first digit of said two-digit numbers being different from any of said single-digit numbers, and means for extending such calls to either of the trunk groups accessible to such operated group relay dependent on whether the number dialled was the one-digit or the two-digit number corresponding to such operated relay.

7. In an automatic telephone system, a relay switch for extending calls, group relays in said switch, a first and a second trunk group accessible to each of said group relays, said trunk groups different for each said relay, other similar switches with corresponding group relays having access to the same trunk groups as said first-named switch, means for operating any one of said group relays in any one of said switches in response to either one of corresponding single and two-digit numbers dialled to such switch by a calling party to extend the call to the first trunk group accessible to said operated relay when the corresponding one-digit number is dialled and to the second trunk group accessible to such relay when the corresponding two-digit number is dialled, said single digit numbers being all different, the second digit of said two-digit numbers corresponding respectively with said single-digit numbers, and the first digits thereof being the same in all cases and different from any of said single-digit numbers.

8. In a telephone system as in claim 7, units relays and an expansion relay in each of said switches, a trunk select unit for each of said trunk groups, means responsive to a calling subscriber dialling any one of said single-digit numbers to any one of said switches for operating the group relay therein corresponding to such number and momentarily seizing the trunk select unit corresponding to the first trunk group accessible to such relay, means responsive to such seizure for controlling the units relays of such switch from said seized unit to extend the call by way of said units and group relays to an idle trunk in said first trunk group, means responsive to a calling subscriber dialling any one of said two-digit numbers to any one of said switches for operating the expansion relay therein on the first digit, and for operating the group relay therein corresponding to said number on the second digit and momentarily seizing the select unit corresponding to the second trunk group accessible to such group relay, and means responsive to such seizure for controlling the units relays of such switch from such seized unit to extend the call by way of said units and group relays to an idle trunk in such second trunk group, said seizures dependent on the operated condition of said expansion relay.

9. In a telephone system as in claim 7, a plurality of groups of said switches, a trunk access unit for each said switch group, a group select unit and a trunk select unit for each said trunk group, units relays and an expansion relay in each said switch, contacts on said relays and on said group relays, means responsive to a calling party dialling any one of said single-digit numbers to any one of said switches for operating the group relay therein corresponding to such number and for momentarily seizing the access unit of the involved switch group, means responsive to such seizure for momentarily seizing the group select unit corresponding to the first trunk group accessible to said operated group relay by way of back contacts on said expansion relay to connect such calling switch to the trunk select unit corresponding to such first trunk group, means responsive to such connection for controlling the units relays of such calling switch from said connected trunk select unit through said seized access and group select units to extend the call to an idle trunk in such first trunk group through the contacts of such switch's group and units relays, means responsive to a calling party dialling any one of said two-digit numbers to any one of said switches for operating the expansion relay therein on the first digit and for operating the group relay therein corresponding to such number on the second digit and momentarily seizing the access unit of the associated switch group, means responsive to said last named seizure for momentarily seizing the group select unit corresponding to the second trunk group accessible to said last operated group relay by way of front contacts on said expansion relay to connect such calling switch to the trunk select unit corresponding to such second trunk group, and means responsive to said last connection for controlling the units relays of such calling switch from said last connected trunk select unit through said last seized access and group select units to extend the call to an idle trunk in such second trunk group through other contacts of such switch's group and units relays.

JOHN H. VOSS.

REFERENCES CITED

The following references are of record in the file of this patent:

UNITED STATES PATENTS

| Number | Name | Date |
|---|---|---|
| 1,923,060 | Appelius | Aug. 22, 1933 |
| 2,279,531 | Saunders | Apr. 14, 1942 |